(12) United States Patent
Montgomery

(10) Patent No.: US 12,216,390 B1
(45) Date of Patent: Feb. 4, 2025

(54) CAMERA MOUNT FOR A SURFBOARD

(71) Applicant: John Robert Montgomery, Honolulu, HI (US)

(72) Inventor: John Robert Montgomery, Honolulu, HI (US)

( * ) Notice: Subject to any disclaimer, the term of this patent is extended or adjusted under 35 U.S.C. 154(b) by 0 days.

(21) Appl. No.: 16/539,934

(22) Filed: Aug. 13, 2019

(51) Int. Cl.
*G03B 17/56* (2021.01)
*G03B 29/00* (2021.01)

(52) U.S. Cl.
CPC .......... *G03B 17/561* (2013.01); *G03B 29/00* (2013.01)

(58) Field of Classification Search
USPC ........................................................ 396/419
See application file for complete search history.

(56) References Cited

U.S. PATENT DOCUMENTS

| | | | | |
|---|---|---|---|---|
| 5,040,915 | A * | 8/1991 | Stuart .................... | B25J 19/063 403/322.3 |
| 8,567,744 | B1 * | 10/2013 | Marn .................... | F16M 11/041 248/548 |
| 8,870,475 | B1 * | 10/2014 | Bennett .................. | F16M 11/10 396/419 |
| 9,268,201 | B1 * | 2/2016 | Montgomery ......... | G03B 29/00 |
| 9,509,889 | B2 * | 11/2016 | Reid ..................... | H04N 5/2251 |
| 9,527,457 | B2 * | 12/2016 | Gasparro ................ | B63B 32/70 |
| 10,308,329 | B2 * | 6/2019 | Rohrer .................... | B63B 32/70 |
| 10,538,297 | B2 * | 1/2020 | Gunner ................ | G03B 17/561 |
| 2010/0061711 | A1 * | 3/2010 | Woodman .............. | F16M 13/02 396/428 |
| 2015/0217839 | A1 * | 8/2015 | Gasparro ............. | G03B 17/561 441/74 |
| 2016/0318459 | A1 * | 11/2016 | Gasparro ............... | G03B 29/00 |
| 2018/0057123 | A1 * | 3/2018 | Gunner ................ | G03B 17/561 |
| 2018/0127068 | A1 * | 5/2018 | Rohrer .................... | B63B 32/70 |
| 2019/0002063 | A1 * | 1/2019 | Rohrer .................... | B63B 32/50 |

* cited by examiner

*Primary Examiner* — Rodney E Fuller
(74) *Attorney, Agent, or Firm* — Plager Schack LLP; Mark H. Plager, Esq.; Michael J. O'Brien, Esq.

(57) ABSTRACT

A breakaway camera mount assembly is configured to detach from a surfboard. The breakaway camera mount assembly has a base plug that includes a rectangular coupling, joined to the base plug cylindrical portion bottom portion and further joined into a rectangular slot on the surfboard. A base attachment is joined to the base plug and further comprising a base attachment cylindrical portion having a plurality of base attachment cylindrical portion openings, such that the plurality of pins extend through the plurality of openings joining the base attachment to the base plug. A post is, joined to the base attachment with the plurality of pins. A camera stick is joined to the post and includes a camera stick first portion that angles into a camera stick second portion. A camera attachment point is joined to the camera stick second portion and configured to accommodate a camera.

2 Claims, 4 Drawing Sheets

CAMERA MOUNT FOR A SURFBOARD

BACKGROUND

The embodiments herein relate generally to athletic equipment.

SUMMARY

A breakaway camera mount assembly is configured to detach from a surfboard. The breakaway camera mount assembly has a base plug that includes a rectangular coupling, joined to the base plug cylindrical portion bottom portion and further joined into a rectangular slot on the surfboard. A base attachment is joined to the base plug and further comprising a base attachment cylindrical portion having a plurality of base attachment cylindrical portion openings, such that the plurality of pins extend through the plurality of openings joining the base attachment to the base plug. A post is, joined to the base attachment with the plurality of pins. A camera stick is joined to the post and includes a camera stick first portion that angles into a camera stick second portion. A camera attachment point is joined to the camera stick second portion and configured to accommodate a camera.

The camera stick first portion further is approximately cylindrical and comprises a camera stick first portion central axis. The camera stick second portion further is approximately cylindrical and comprises a camera stick second portion central axis. A camera stick angle measured is clockwise from the camera stick first portion central axis to the camera stick second portion central axis. The camera stick angle is at least 10 degrees but no more than 60 degrees.

BRIEF DESCRIPTION OF THE FIGURES

The detailed description of some embodiments of the invention is made below with reference to the accompanying figures, wherein like numerals represent corresponding parts of the figures.

DETAILED DESCRIPTION OF CERTAIN EMBODIMENTS

Figure 1:
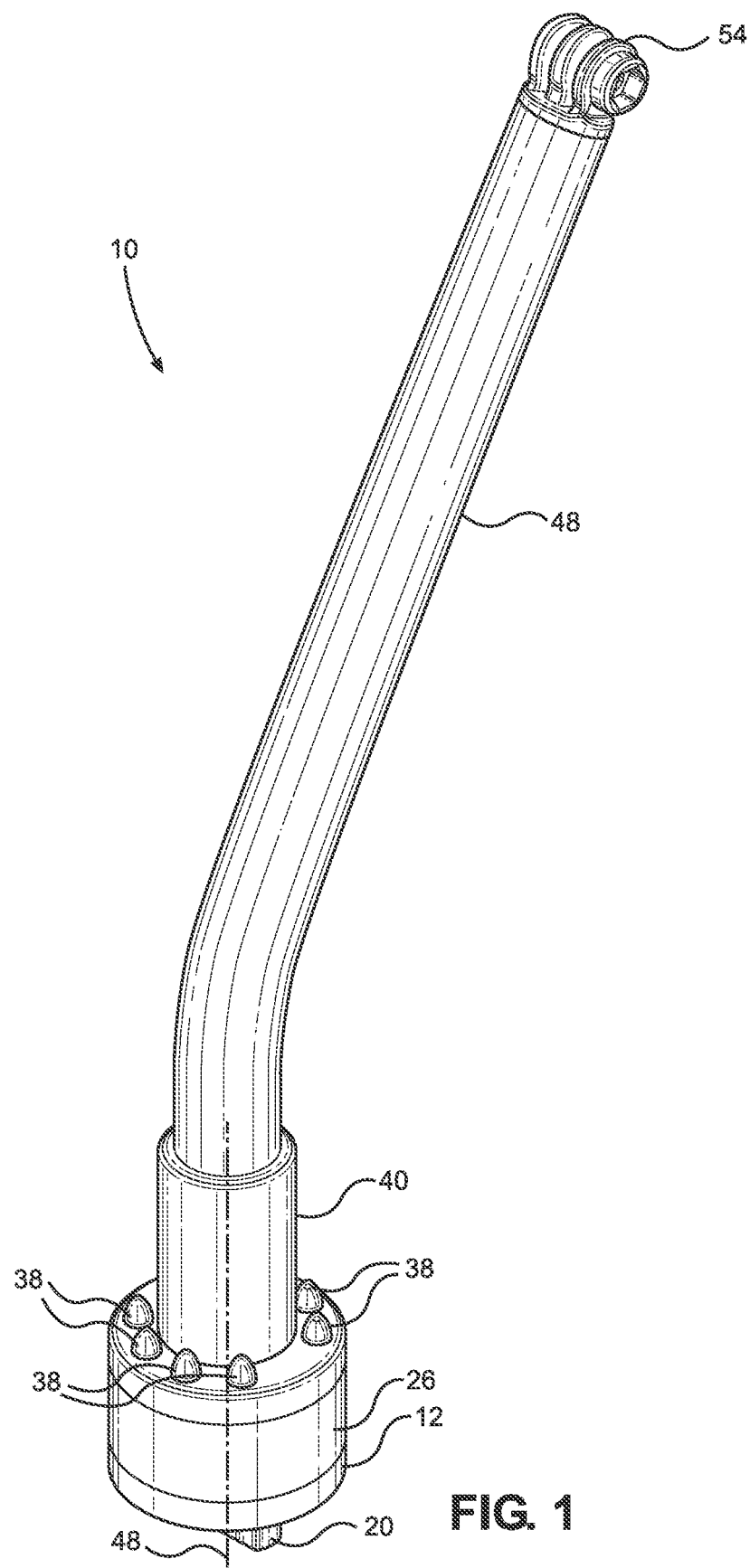
FIG. 1 shows a perspective view of one embodiment of the present invention.
Figure 2:
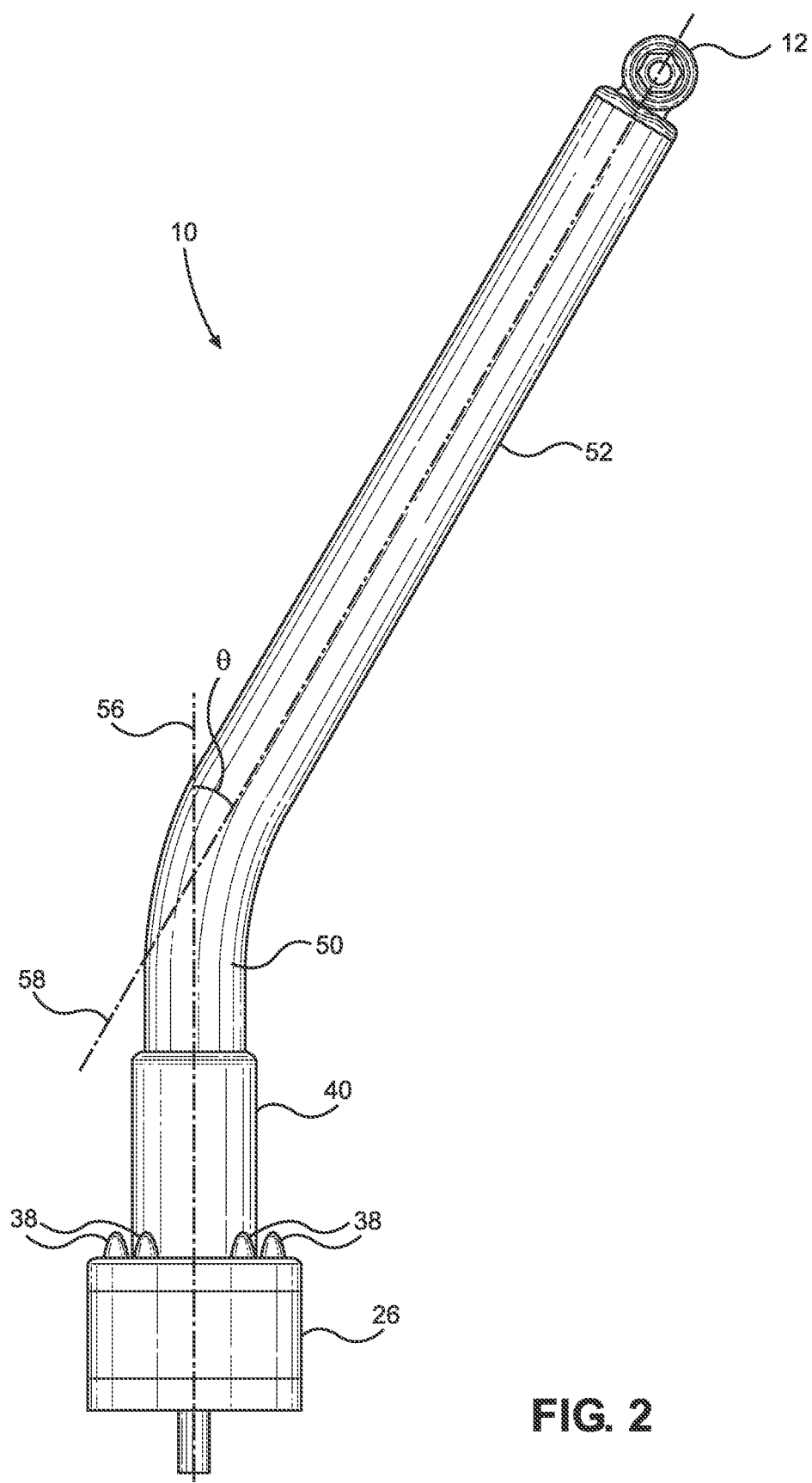
FIG. 2 shows a side view of one embodiment of the present invention.
Figure 3:
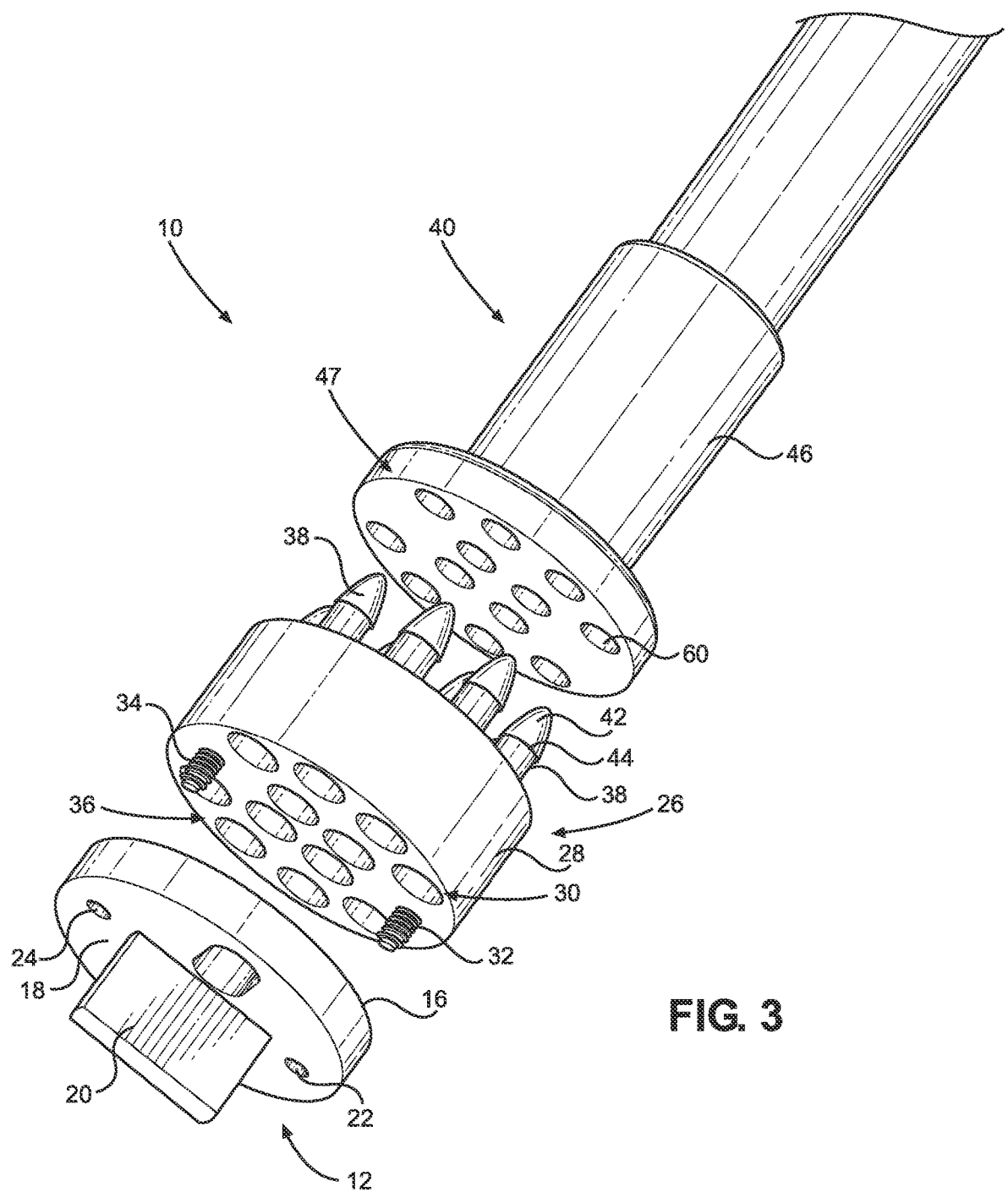
FIG. 3 shows an assembly view of one embodiment of the present invention.
Figure 4:
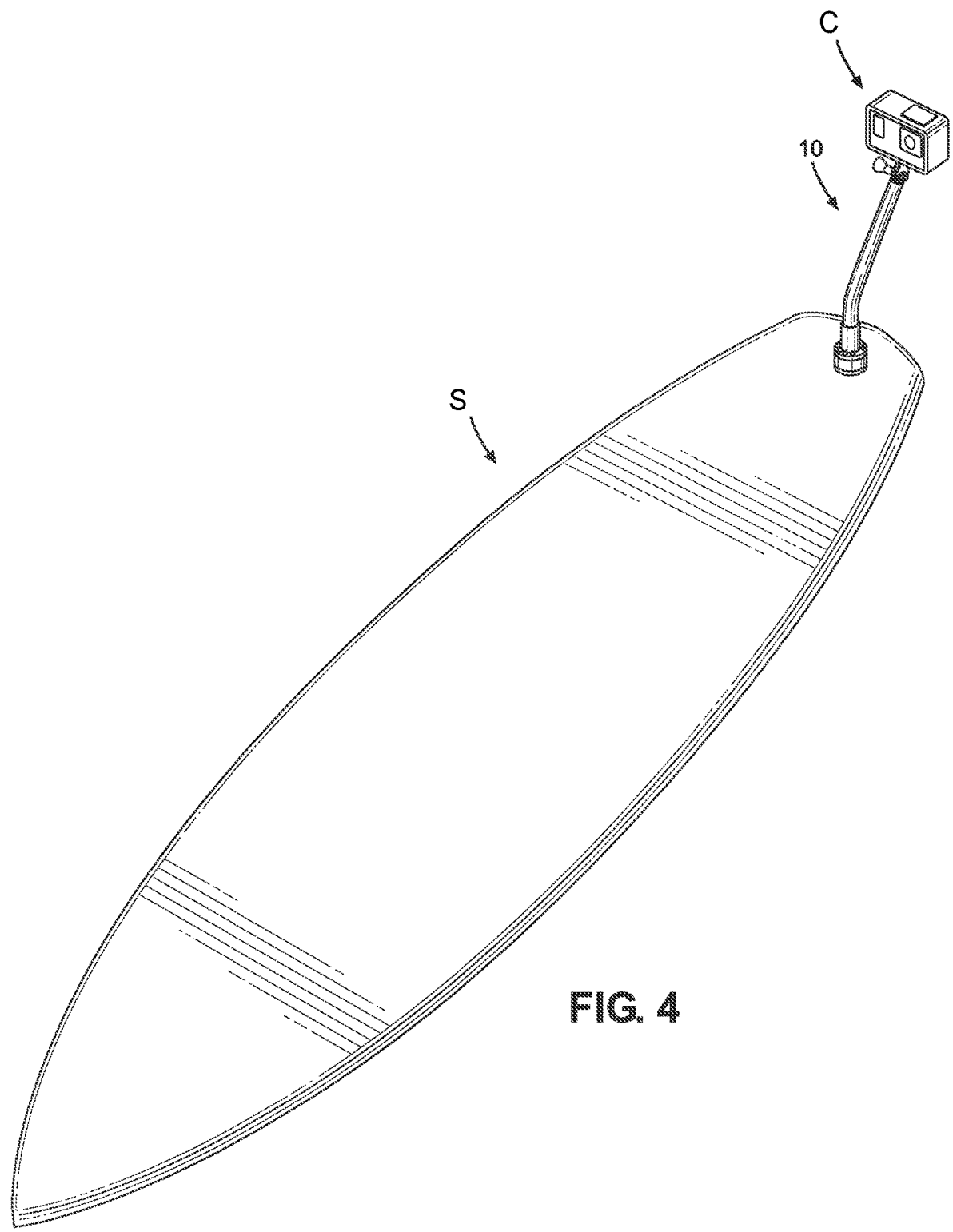
FIG. 4 shows a perspective view of one embodiment of the present invention shown in use.

By way of example, and referring to FIGS. 1-4, one embodiment of a breakaway camera mount assembly 10 is configured to detach from a surfboard S. The breakaway camera mount assembly 10 comprises a base plug 12.

The base plug 12 further comprises a base plug cylindrical portion 14 having a base plug cylindrical portion top portion 16 and a base plug cylindrical portion bottom portion 18. A rectangular coupling 20 is joined to the base plug cylindrical portion bottom portion 18 and further joined into a rectangular slot on the surfboard S. A first threaded opening 22 and a second threaded opening 24 traverse the base plug cylindrical portion 14 from the base plug cylindrical portion top portion 16 to the base plug cylindrical portion bottom portion 18.

In some embodiments, the surfboard has a fin control system or FCS plug. The base plug 12 can be a plastic cylinder with a rectangular coupling that fits into the FCS plug in the surfboard. The base plug 12 can be tightened into place using a small screw that affixes the base plug 12 to the surfboard S.

A base attachment 26 further comprises a base attachment cylindrical portion 28 having a plurality of base attachment cylindrical portion openings 30. A first threaded member 32 and a second threaded member 34 extend through a base attachment cylindrical portion bottom side 36. A plurality of pins 38 rest against a base plug cylindrical portion top portion 16 and extend through the plurality of base attachment cylindrical portion openings 30.

Each pin 38 further comprises a pin cylindrical shaft 40 joined to a pin bullnose 42. A pin bullnose lower edge 44 has a larger radius then the pin cylindrical shaft 40.

In some embodiments, each pin 38 can be made from polyurethane such that when the plurality of pins 38 extend through the plurality of base attachment cylindrical portion openings 30 each pin bullnose lower edge 44 is compressed through the plurality of base attachment cylindrical portion openings 30. Then, the pin bullnose 42 expands past the opening A post 40 further includes a lower rim 47. The lower rim 47 further includes a plurality of rim openings 60 that are aligned with the plurality of base attachment cylindrical portion openings 30, and joined to the plurality of pins 38. The pin bullnose 42 of each pin 38 expands past each corresponding rim opening 44 to attach the base attachment 26 to the base plug 12. A post cylinder 46 is attached to the lower rim 47 and extends upward from the lower rim 42 along a post cylinder central axis 48.

A camera stick 48 is joined to the post 40 and further comprises a camera stick first portion 50 that angles into a camera stick second portion 52. In some embodiments, the camera stick 48 can be glued to the post 40. A camera attachment point 54 is joined to the camera stick second portion 52 and configured to accommodate a camera C. The camera stick first portion 50 further is approximately cylindrical and comprises a camera stick first portion central axis 56. The camera stick second portion 52 further is approximately cylindrical and comprises a camera stick second portion central axis 58. A camera stick angle θ is measured clockwise from the camera stick first portion central axis 56 to the camera stick second portion central axis 58. The camera stick angle is at least 10 degrees but no more than 60 degrees. Preferably, the camera angle can be about 30 degrees.

As used in this application, the term "a" or "an" means "at least one" or "one or more."

As used in this application, the term "about" or "approximately" refers to a range of values within plus or minus 10% of the specified number.

As used in this application, the term "substantially" means that the actual value is within about 10% of the actual desired value, particularly within about 5% of the actual desired value and especially within about 1% of the actual desired value of any variable, element or limit set forth herein.

All references throughout this application, for example patent documents including issued or granted patents or equivalents, patent application publications, and non-patent literature documents or other source material, are hereby incorporated by reference herein in their entireties, as though individually incorporated by reference, to the extent each reference is at least partially not inconsistent with the disclosure in the present application (for example, a reference that is partially inconsistent is incorporated by reference except for the partially inconsistent portion of the reference).

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

Any element in a claim that does not explicitly state "means for" performing a specified function, or "step for" performing a specified function, is not to be interpreted as a "means" or "step" clause as specified in 35 U.S.C. § 112, ¶6. In particular, any use of "step of" in the claims is not intended to invoke the provision of 35 U.S.C. § 112, ¶6.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A breakaway camera mount assembly, configured to detach from a surfboard, the breakaway camera mount assembly, comprising:
    a base plug, further comprising a base plug cylindrical portion having a base plug cylindrical portion top portion, a base plug cylindrical portion bottom portion, and a plurality of pins extending upward from the base plug cylindrical portion top portion, each pin comprising a bullnose at the upper end thereof;
    a rectangular coupling, joined to the base plug cylindrical portion bottom portion and further joined into a rectangular slot on the surfboard; and
    a base attachment, joined to the base plug and further comprising a base attachment cylindrical portion having a plurality of base attachment cylindrical portion openings through which the plurality of pins extend;
    a post, further comprising:
        a rim further comprising a plurality of rim openings, aligned with the plurality of base attachment cylindrical portion openings, the plurality of pins, wherein each of the pins extends through a corresponding one of the rim openings and the pin bullnose of each pin expands past the corresponding rim opening to hold the base attachment to the rim solely mechanically;
        a post cylinder, attached to the rim and extending upward from the rim along a post cylinder central axis; and
        a camera stick joined to the post, the camera stick comprising a camera stick first portion that angles into a camera stick second portion, and a camera attachment point joined to the camera stick second portion and configured to accommodate a camera.

2. The breakaway camera mount assembly of claim 1, wherein the camera stick first portion further is approximately cylindrical and comprises a camera stick first portion central axis;
wherein the camera stick second portion further is approximately cylindrical and comprises a camera stick second portion central axis;
wherein a camera stick angle measured clockwise from the camera stick first portion central axis to the camera stick second portion central axis is at least 10 degrees but no more than 60 degrees.

* * * * *